(12) United States Patent
Agullo

(10) Patent No.: US 8,201,769 B2
(45) Date of Patent: Jun. 19, 2012

(54) DEVICE FOR UNWINDING A FLEXIBLE SUPPORT WIRE FOR VINES

(75) Inventor: Miquel Massaguer Agullo, Terrassa (ES)

(73) Assignee: A. Raymond et Cie, Grenoble (FR)

( * ) Notice: Subject to any disclaimer, the term of this patent is extended or adjusted under 35 U.S.C. 154(b) by 353 days.

(21) Appl. No.: 12/522,934

(22) PCT Filed: Dec. 20, 2007

(86) PCT No.: PCT/EP2007/011269
§ 371 (c)(1),
(2), (4) Date: Jul. 13, 2009

(87) PCT Pub. No.: WO2008/089834
PCT Pub. Date: Jul. 31, 2008

(65) Prior Publication Data
US 2010/0096487 A1    Apr. 22, 2010

(30) Foreign Application Priority Data
Jan. 23, 2007  (FR) .................................. 07 00448

(51) Int. Cl.
*B65H 49/00* (2006.01)
(52) U.S. Cl. ................ 242/588.6; 242/597.8; 242/611.1
(58) Field of Classification Search .................. 242/382, 242/382.5, 384.7, 385, 385.4, 396, 396.1, 242/396.2, 396.4, 421, 422, 422.4, 422.9, 242/588, 588.3, 588.6, 597, 597.1, 597.3, 242/597.5, 597.8, 611, 611.1, 614, 129.8, 242/156, 156.2; 188/69, 82.1, 82.7
See application file for complete search history.

(56) References Cited

U.S. PATENT DOCUMENTS

| 3,796,392 | A | * | 3/1974 | Starace ......................... 242/156 |
| 4,475,695 | A |   | 10/1984 | Franks |
| 6,152,395 | A | * | 11/2000 | Corriveau et al. ......... 242/388.6 |

FOREIGN PATENT DOCUMENTS

| FR | 2743258 A1 | 7/1997 |
| NL | 1018107 C2 | 11/2002 |
| WO | WO96/29855 A1 | 10/1996 |
| WO | WO99/62327 A1 | 12/1999 |

* cited by examiner

*Primary Examiner* — William E Dondero
(74) *Attorney, Agent, or Firm* — Faegre Baker Daniels

(57) ABSTRACT

The invention relates to a device for unwinding a flexible support wire for vines, comprising a dispenser having a rack (12) provided with means for fastening to a carrier cable, a winding reel (14) for said support wire, mounted on the rack (12) rotatably about an axis of rotation, and rotational retention means for the winding reel (14), which are capable of assuming a retention state in which the rotation of the winding reel (14) is blocked and a release state in which the winding reel (14) is able to rotate freely. The device includes remote control means for guiding the changeover of the retaining means from the retention state to the release state and conversely.

8 Claims, 4 Drawing Sheets

DEVICE FOR UNWINDING A FLEXIBLE SUPPORT WIRE FOR VINES

CROSS-REFERENCE TO RELATED APPLICATION

This application is a U.S. National Phase Patent Application based on International Application Serial No. PCT/EP2007/011269 filed Dec. 20, 2007, the disclosure of which is hereby explicitly incorporated by reference herein.

BACKGROUND OF THE INVENTION

1. Field of the Invention

The present invention relates to a device for unwinding a flexible support wire for vines.

2. Description of the Related Art

Recent years have seen the development of a cultivation method known as "lateral extension growth," which is currently being used primarily to grow tomatoes in greenhouses.

In this method, the young plant is attached to the vertical support wire paid out from the dispenser, which is fastened, substantially vertically from said plant, to the carrier cable stretched horizontally near the roof of the greenhouse, that is, generally several meters off the ground. This carrier cable is disposed above a row of plants whose spacing depends on the type of plant concerned.

The plant is guided during its growth by the support wire, and is fastened to it by means of suitable attaching devices as it increases in size.

When the fruit-bearing, aerial portion of the plant attains a height that makes access difficult, a given additional length of support wire is paid out and the dispenser is moved along the carrying cable by translating the rack. The unproductive lower portion of the plant thus forms a curve that droops onto the ground. This operation is repeated several times during the growth of the plant, which may reach lengths of more than dozen meters (for example in the case of tomatoes).

This cultivation method makes it possible to increase the yield of cultivated areas and to save on labor and the purchase of young plants.

The document WO96/29855 describes a device of the aforesaid type, in which one of the side plates of the winding reel is integrally equipped with a ratchet wheel. The dispenser comprises a roughly L-shaped locking lever, with two branches that form an acute angle. The large branch is mounted pivotably on the rack, and comprises, between the pivot point and its free end, a projecting part that is oriented toward the wheel and constitutes a latch that is able to cooperate with the ratchets. The portion of the large branch that lies between the pivot point and the junction area of the projecting part is flexible and elastic. The small branch, for its part, is designed to cooperate by its free end with the carrier cable, which has a suitable cross section.

The free end of the large branch constitutes a region for the application of manual pressure to cause the locking lever to pivot until the free end of the small branch is brought into contact with the upper face of the carrier cable. The pivoting of the locking lever thus is blocked. From this state, if the operator presses harder, the portion of the large branch between the pivot point and the junction area of the projecting part deforms elastically. If enough pressure is applied, the deformation can be such that it causes the ratchet wheel to be released as a result of disengagement of the latch. The weight of the plant then causes the reel and, concomitantly, the ratchet wheel to rotate. The ratchets are in continuous contact with the lower face of the carrier cable. The rotation of the ratchet wheel imposed by the weight of the plant causes the dispenser to undergo a translational movement along the carrier cable in the direction in which the manual pressure was exerted.

Thus, to bring about the release of a support wire, it is necessary to take the rack in one hand without detaching the cable dispenser and to exert pressure on the large branch of the locking lever with the other hand.

A device of this kind, however, has the disadvantage that the user has to climb a ladder or other object and use both hands simultaneously. Thus, neither hand is free to take hold of a guard rail to prevent falls. Keeping in mind that these troublesome manipulations are performed more than 3 m off the ground, it will be appreciated that the work becomes dangerous and very tiresome (due to the necessity of repeatedly climbing the ladder or other object), considering that a greenhouse can require the use of several thousand unwinding devices.

SUMMARY OF THE INVENTION

The present invention provides an unwinding device for unwinding a flexible support wire for vines, that is simple, easy to use and poses no risk to the user. The device includes a dispenser having:
 a rack equipped with means for fastening to a carrier cable;
 a winding reel for said support wire, mounted on said rack rotatably about an axis of rotation; and
 rotational retention means for the winding reel, capable of assuming a retention state in which the rotation of the winding reel is blocked and a release state in which the winding reel is able to rotate freely.

Means for fastening to the carrier cable generally comprise a hook that can be moved along said cable, which is stretched horizontally at a substantial height (about 3 m off the ground). The flexible support wire, constituted by a rope or string, is unwound from the dispenser. The plant is attached and guided during its growth.

According to the invention, this aim is achieved by the fact that the device comprises remote control means for guiding the changeover of the retaining means from the retention state to the release state and conversely.

In a preferred embodiment, the remote control means comprise attachment means on the dispenser, preferably for the attachment of a hook. Such a hook can, for example, be mounted on the end of a force transmission pole.

In a preferred variant, the rotational retention means comprise:
 at least one retaining element which in the retention position cooperates with complementary retaining elements, formed on the periphery of a cogwheel integral to the winding reel, to prevent the winding reel from rotating;
 displacement means that displace the retaining element toward a release position in which the cogwheel is released; and
 automatic return means that return the retaining element toward the retention position.

In this variant, the displacement and return means acting on the retaining element comprise a flexible arm made of a flexible and elastic material, which arm carries said retaining element and has a first end fastened to the rack and a second end provided with said attachment means. These attachment means are, for example, formed by a closed loop.

In one form thereof, the present invention provides a dispenser for a flexible support wire for vines, having: a rack provided with means for fastening to a carrier cable; a winding reel for the support wire, mounted on a front face of the rack rotatably about an axis of rotation; a flexible arm provided with hook-type attachment means and at least one retaining element cooperating, in a retention position in which the rotation of the reel is blocked, with complementary retaining elements integral to the reel; and the flexing movement of the flexible arm effecting the displacement of the retaining element toward a release position in which the complementary retaining elements are released, characterized in that the rack includes a stop in the flexing movement of the flexible arm.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
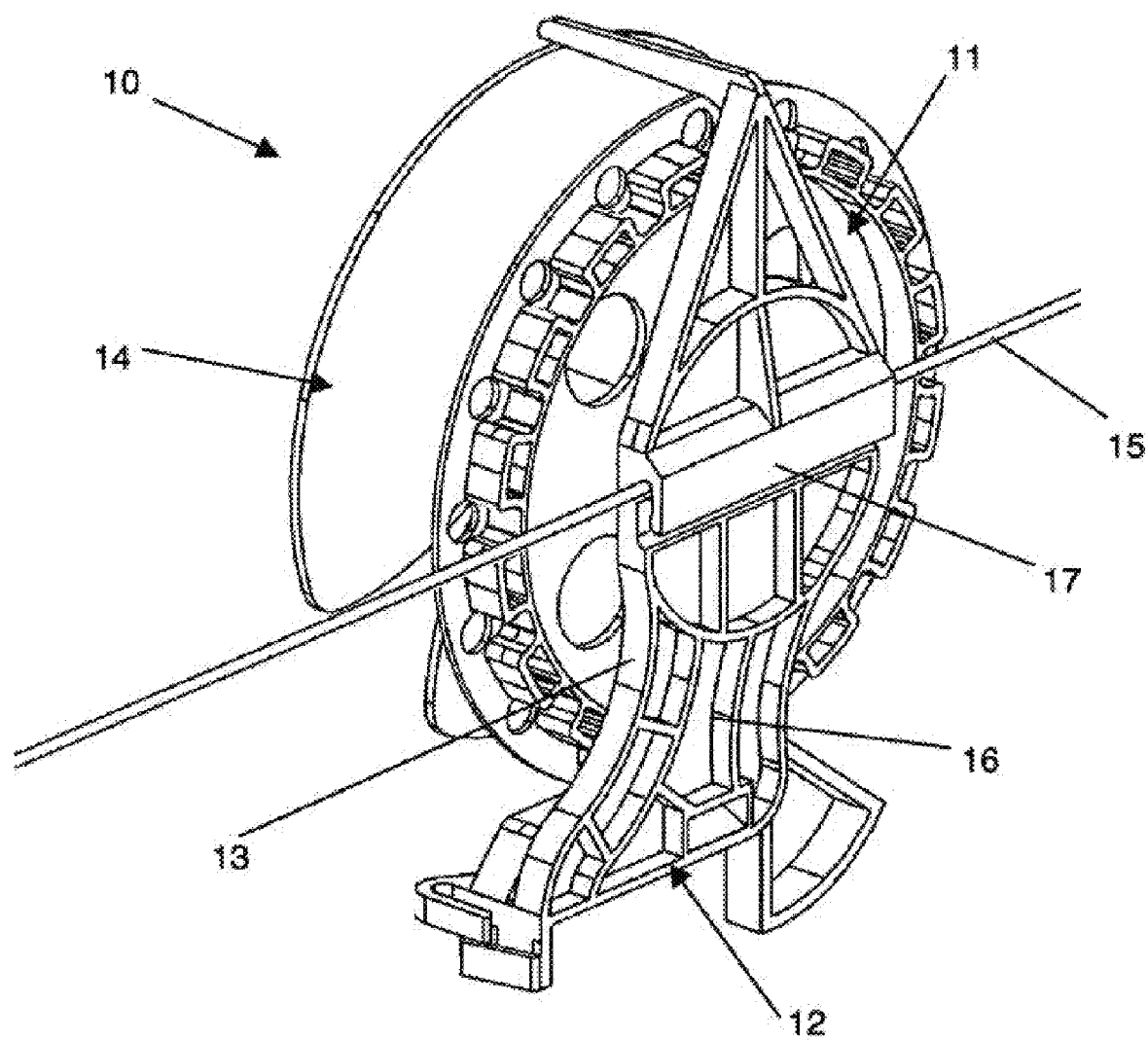
FIG. 1 is a right rear perspective view of the dispenser in one example of an unwinding device according to the invention.
Figure 2:
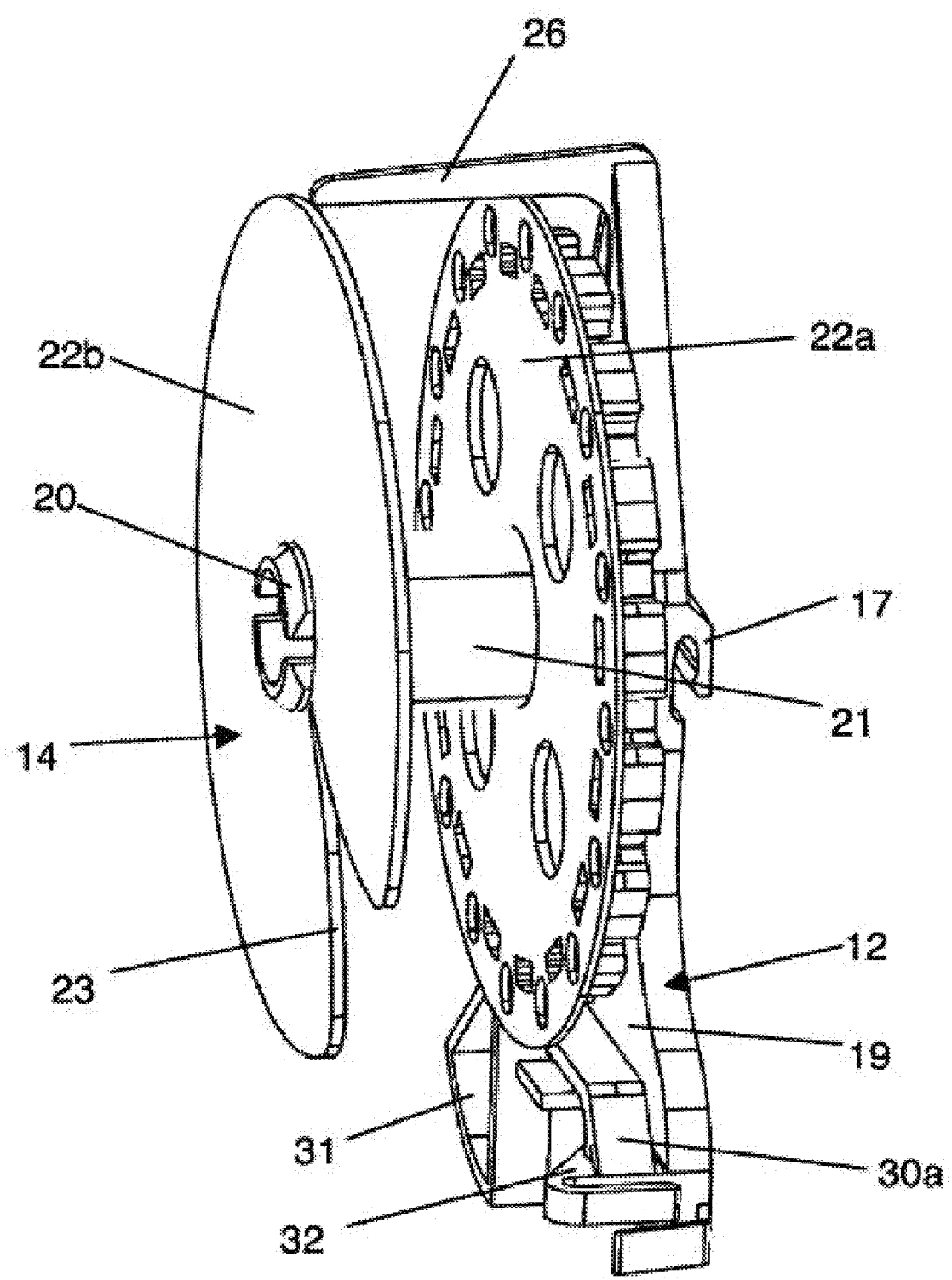
FIG. 2 is a right front perspective view of the dispenser from FIG. 1.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

In reference to the figures, an example of an unwinding device 10 according to the invention has a dispenser 11 comprising a rack 12 provided with a planar frame 13. The dispenser 11 is further composed of a winding reel 14 for a flexible support wire (not shown). The reel 14 is supported by the rack 12. The dispenser 11 is designed to be attached to a carrier cable 15 disposed several meters off the ground, substantially vertical to a row of vines whose spacing depends on the type of plant concerned. For this purpose, a rear face 16 of the planar frame 13 has in its upper portion a hook 17 that extends over its entire width. These conventional fastening means permit quick attachment of the dispenser 11 to the carrier cable 15, as well as easy and very rapid displacement of the dispenser 11 along the cable 15 completely under the control of the user. The dispenser 11 serves to release a free length of support wire by unwinding it from the reel 14. The free length is designed to extend substantially vertically down to the ground so that a vine can be fastened and guided by means of suitable attaching devices as it grows. The rack, of any given cross section, can be a string, a rope, or any other element made of a suitable flexible material.

To fasten the reel 14 to the rack 12 in an easy and removable manner, a tubular mounting sleeve 18 extends perpendicularly from the front face 19 of the planar frame 13, i.e., the opposite face from rear face 16, at the same height as the hook 17. A retaining stop 20 projects from the outer surface of the mounting sleeve 18 at the level of its distal end, that is, the opposite end from the end by which it is connected to the planar frame 13. The retaining stop 20 is composed of an inner shoulder, which is connected to the outer surface of the mounting sleeve 18, and an outer chamfer.

In a conventional manner, the reel 14 has a hub 21 whose ends support side walls 22a, 22b disposed perpendicularly to the hub 21, one of which side walls, 22b, is provided with a starter notch 23 through which the end of the wound-up length of support wire can be passed in order to fasten it on the outside of side wall 22b, for example by making a knot. Side walls 22a and 22b have a circular contour.

To constitute the retaining stop 20, the diameter of the cylindrical outer surface connecting the inner shoulder and the outer chamfer of the mounting sleeve 18 is greater than the inner diameter of the hub 21 of the reel 14. To enable the hub 21 of the reel 14 to be mounted on the outer surface of the mounting sleeve 18, straight openings 24 extend axially from the distal end of the mounting sleeve 18. During the mounting of the reel 14, the straight openings 24 promote radial deformation of the sleeve 18 in the direction of its axis of revolution. The outer chamfer facilitates the engagement of the reel 14 by the free end of the sleeve 18, by converting this axial movement into radial deformation of the sleeve 18. By elastic rebound of the constituent material of the sleeve 18, the inner shoulder then operates to retain the hub 21 of the sleeve 14. The reel 14 is then in the state of being mounted on the rack 12 rotatably about an axis of rotation that corresponds to the axis of revolution of the mounting sleeve 18.

The upper portion of the rack 12, that is, that portion of the rack 12 which is located above the hook 17, has two convergent lateral edges 25a, 25b, each of which meets the other at one of its ends. At the point of convergence of edges 25a, 25b, the rack comprises a straight wiper 26 disposed parallel to the hub 21 of the winding reel 14. The wiper 26 extends above the winding reel 14. Its length and position are chosen such that it overlaps with the respective contours of the two side walls 22a, 22b, but with a gap remaining between said contours and the wiper 26 to prevent friction and to limit the load moment in the rotational movement of the reel 14 with respect to the rack 12. This gap is advantageously chosen to be smaller than the thickness of the support wire, such that the wiper 26 serves to confine the portion of the support wire still wound up on the hub 21 in the space between the two side walls 22a, 22b.

A cogwheel 27 is cantilevered from one of the faces of that side wall 22a which is closer to the rack 12, more precisely cantilevered from the face that faces the rack 12. The cogwheel 27 is produced by being molded onto side wall 22a or, alternatively, directly during the molding of side wall 22a, in such a way that the cogwheel is integral to the winding reel 14. The cogwheel has a diameter that is smaller than the contour of side wall 22a. The periphery of the cogwheel is constituted by a plurality of cogs 28, sixteen in number, delimiting between them as many notches 29. It goes without saying that the cogwheel 27 can be produced in any suitable manner, provided that it is integral to the reel 14. Moreover, the cogwheel 27 can be disposed in proximity to the other side wall 22b without departing from the scope of the invention, particularly by being cantilevered from the opposite face of side wall 22a from the rack 12.

Figure 3:
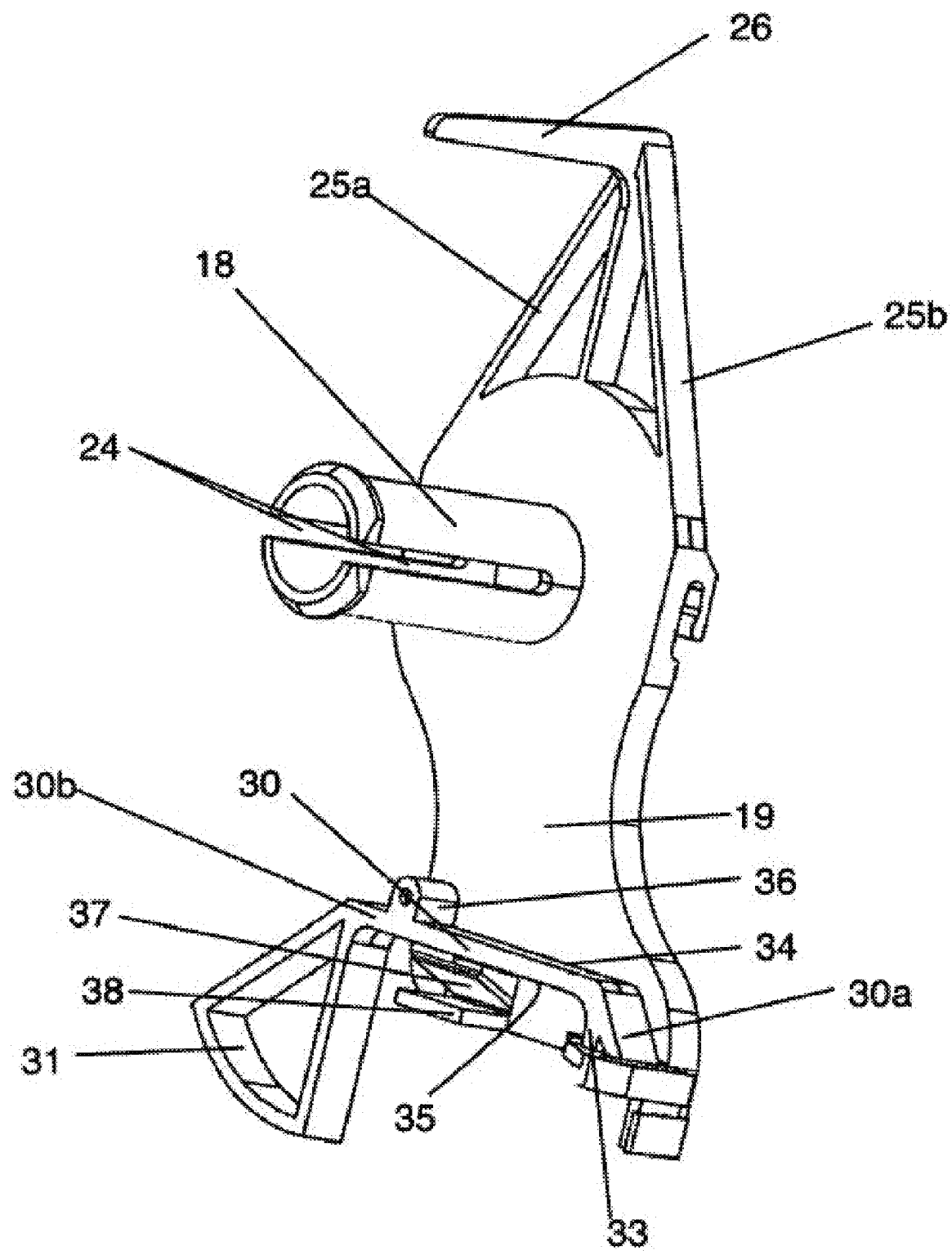
FIG. 3 is a right front perspective view of the rack for the dispenser from FIGS. 1 and 2.
Figure 4:
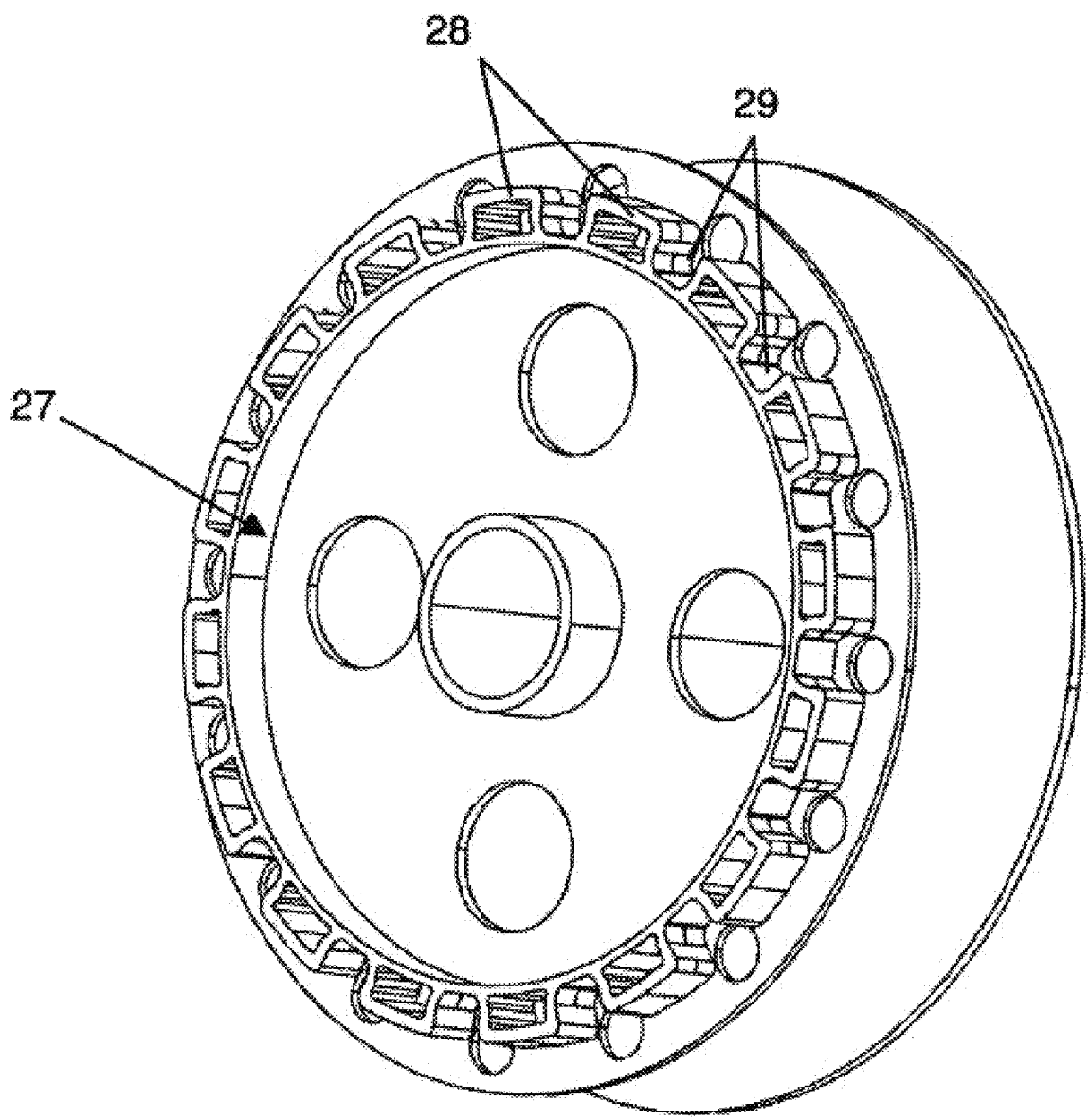
FIG. 4 is a rear perspective view of the winding reel of the dispenser from FIGS. 1 and 2.

In addition, the dispenser 11 comprises an overall straight, flexible arm 30 made of a flexible and elastic material and having a first end 30a, for example bent as shown in FIG. 3, which is fastened to the rack 12, and second end 30b provided with a planar closed loop 31 in the shape of a triangle whose base is slightly rounded. In its natural configuration, flexible arm 30 extends parallel to the front face 19 of planar frame 13, with the interposition of a very slight play to enable it to insert itself between side wall 22a of the reel 14 and the front face 19 of planar frame 13, below the reel 14. In this example, flexible arm 30 is oriented so as to be parallel to the hook 17. Flexible arm 30 thus is parallel to the direction of the carrier cable 15 when it is inserted in the hook 17. The first end 30a is joined to a first wall 32 of the rack 12, which wall is connected perpendicularly to the front face 19 of the planar frame 13, so as to be parallel to the hook 17. A reinforcing rib 33 extends between the wall 32 and the flexible arm 30 to strengthen the connection between the rack 12 and the flexible arm 30. The reinforcing rib 33 joins the flexible arm 30 at the level of its first end 30a.

The cross section of flexible arm 30 is rectangular. Flexible arm 30 thus has, on the one hand, a first face 34 that is turned toward the reel 14, more precisely toward the cogwheel 27, and comprises a projecting stud 36, and, on the other hand, a second, opposite face 35. The projecting stud 36 preferably has, overall, the shape of a rectangular parallelepiped, whose upper face is arched in this example. The dimensions of the projecting stud 36 are chosen so that the notches 29 are of complementary shape to the projecting stud 36.

The relative positioning between the flexible arm 30 and the cogwheel 27 is chosen so that when the flexible arm 30 is in its straight natural configuration, the projecting stud 36 carried by the flexible arm 30 is engaged in a notch 29 of the cogwheel 27. Moreover, the length of the flexible arm 30 and the height of the projecting stud 36 are chosen so that a force applied to the closed loop 31 from the opposite side of the reel 14 causes the projecting stud 36 to disengage from the notch 29 in which it had been engaged. This disengagement is brought about by the displacement of the projecting stud 36 in the opposite direction from the cogwheel 27, which displacement is, in turn, caused by the flexion of flexible arm 30 out of its natural configuration. The joint between the flexible arm 30 and the rack 12 is chosen so that the flexing movement of the flexible arm 30 and, concomitantly, the displacement of the projecting stud 36 are executed in a plane parallel to the front face 19 of the planar frame 13.

Consequently, flexible arm 30 equipped with projecting stud 36, in combination with cogwheel 27 provided with notches 29, form rotational retention means for the winding reel 14 that are capable of assuming a retention state in which the rotation of the winding reel 14 is blocked and a release state in which the winding reel 14 is free to rotate. In these retaining means, the projecting stud 36 constitutes a retaining element which in the retention position cooperates with complementary retaining elements (i.e., the notches 29) formed on the periphery of cogwheel 27 to prevent the reel 14 from rotating. When projecting stud 36 is not in any of the notches 29, projecting stud 36, which constitutes the retaining element, is in the release position in which the cogwheel 27 is released.

Conversely, it is conceivable to provide a notch (not shown) in the first face 34 of the flexible arm 30 to cooperate with the cogs 28 formed on the periphery of the cogwheel 27. In this case, the dimensions and the shape of this notch will be chosen so that the cogs 28 are of complementary shape to the notch. In this unillustrated variant, the notch participates in the rotational retention means for the reel 14 and constitutes the retaining element which in the retention position (the position in which a cog 28 is engaged in the notch provided in the first face 34 of the flexible arm 30) cooperates with complementary retaining elements constituted by the cogs 28 to prevent the reel 14 from rotating.

In this example, the closed loop 31 is integrally cantilevered from the second face 35 of the flexible arm 30. However, any other configuration of the closed loop 31 may be contemplated, such as, for example, in the prolongation of the flexible arm 30, or, alternatively, integrally cantilevered from the first face 34 of the flexible arm 30. Moreover, closed loop 31 is oriented with respect to flexible arm 30 in such a way that flexible arm 30 extends in the plane of closed loop 31, but other orientations are conceivable, for example perpendicularly, creating a 90° angle between flexible arm 30 and the plane of closed loop 31. In addition, the shape of closed loop 31 can be modified.

It will be understood from the previously described example that closed loop 31 is part of the remote control means according to the invention. The closed loop 31 is on the dispenser 11 and constitutes attachment means preferably permitting the attachment of a hook. This hook can, for example, be mounted on the end of a force transmission pole. The rotational retention means for the reel 14 further comprise:

at least one retaining element (projecting stud 36) cooperating in the retention position with complementary retaining elements (notches 29) formed on the periphery of a cogwheel 27 integral to the winding reel 14, to prevent the winding reel 14 from rotating;
  displacement means that displace the retaining element toward a release position in which the cogwheel 27 is released; and
  automatic return means that return the retaining element toward the retention position.

Specifically, these displacement and return means for the retaining element comprise the flexible arm 30 made of flexible and elastic material, which carries the retaining element and which has a first end 30a fastened to the rack 12 and a second end 30b provided with attachment means.

The manner of operation of the above unwinding device will be better understood from a reading of the following explanation. When the flexible arm 30 is in its natural configuration, i.e., idle, the rotational retention means of the winding reel 14 are in the retention state, since the retaining element is in the retention position due to its engagement in a complementary retaining element of cogwheel 27. Rotation of the reel 14 is thereby blocked or prevented. A force applied to closed loop 31 in an opposite direction from winding reel 14 causes flexible arm 30 to flex out of its natural configuration. The flexion of flexible arm 30 causes a corresponding displacement of the retaining element. When the flexible arm 30 has flexed sufficiently so that the retaining element has reached the release position, cogwheel 27, and consequently winding reel 14, are released, which corresponds to the release state of the rotational retention means. Reel 14 is therefore free to rotate.

The automatic return means are constituted by the elasticity of the constituent material of flexible arm 30, which tends to cause the return of flexible arm 30 toward its natural configuration, in combination with the elasticity of the constituent material of a flexible leaf 37 made of elastic material and having a first end fastened to the rack 12 and a second end that bears against the second face 35 of the flexible arm 30, i.e., the opposite face from that 34 which is turned toward the winding reel 14. Clearly, the force to be applied to the closed loop 31 must be sufficient to oppose the return means. When force ceases to be applied to closed loop 31, these return means cause the automatic return of the retaining element toward the retention position. The rotational retention means of the winding reel 14 are again in the initial, retention state in which rotation of the reel 14 is blocked.

In the example illustrated, the flexible leaf 37 is fastened at its first end to the planar frame 13 of the rack 12, and extends away from the rack 12 in such a way that its second end is in permanent contact with the second face 35 of the flexible arm 30. In this way, the flexing movement of the flexible leaf 37, imposed during the flexion of flexible arm 30, is executed in a plane perpendicular to the front face 19 of the planar frame. In addition, a second wall 38 extends from the front face 19 of the planar frame 13 in a direction parallel to the first wall 32 and below the flexible leaf 30. The second wall 38 constitutes a stop in the flexing movement of the flexible leaf 37, and consequently in the flexing movement of the flexible arm 30. The purpose of the second wall 38 is to prevent damage to the flexible leaf 37 and to the joint between the flexible arm 30 and the rack 12 should excessive force be applied to the closed loop 31.

In other examples not shown, the flexible leaf 37 and the second wall 38 are omitted. The automatic return means are constituted in this case solely by the elasticity of the constituent material of the flexible arm 30. The material must be so selected that its modulus of elasticity causes the flexible arm 30 to return toward its natural configuration solely by virtue of the natural tendency of the material to return automatically toward its natural configuration.

This manipulation for unwinding a length of flexible support wire is very simple to perform, since the force applied to the closed loop 31 by the user can be transmitted from the ground. In other words, due to the interposition of the closed loop 31, the user can remotely control the changeover of the retaining means from one state to the other, using for example a force transmission pole fitted at one end with a hook that hooks into the attachment means constituted by the closed loop 31. More precisely, the unwinding device 10 described hereinabove thus comprises remote control means for guiding the changeover of the retaining means from the retention state to the release state and conversely. The remote control means thus comprise the closed loop 31, integral to the flexible arm 30, and the pole equipped with such a hook. It is readily apparent that other tools besides a force transmission pole can be used without departing from the scope of the invention. The control of the retaining means is effected remotely in the sense that the retaining means are guided from one state to the other by the user located on the ground, even though the dispenser 11 is fastened to the carrier cable 15 at a much greater height than that which the user can reach with his or her hands when not employing a ladder or other object.

In a variant, it is clear that to constitute the retaining means, the flexible arm 30 may be replaced by a rigid lever pivotably mounted on the rack. This rigid lever can carry the retaining element (projecting stud or notch) on one face and be equipped with attachment means at one end. The automatic return of the retaining element toward the retention position can be effected by any appropriate means, for example with the aid of a torsion spring that returns the rigid lever toward a position in which the retaining element cooperates with the cogwheel 27 to prevent the reel 14 from rotating. In this variant, the displacement of the retaining element toward the release position is brought about by the pivoting of the rigid lever from the retention position toward a position in which the retaining element disengages from the cogwheel 27 and releases it.

Regardless of the variant considered, the flexible arm 30 or the rigid lever can be equipped with other attachment means besides a hook, such as, for example, an open loop 31 constituting a hook serving to catch the hook of the force transmission pole. In another approach, a chain or a string having a length that renders it accessible at one end to the hand of a user standing on the ground can be fastened at its other end to the second end 30b of the flexible arm 30, i.e., the opposite end from end 30a connected to the rack 12. This chain or string can also serve to control the retaining means in the variant where the flexible arm is replaced by a rigid lever.

The remote control means described hereinabove represent different mechanical realizations, but they could indifferently take the form of other types of means—electronic, for example. To take an example, each rack can have a flexible lever whose pivoting in both directions is driven by a very simple electric motor connected to an electronics that is remote-controlled, for example by radio.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A dispenser for use with a carrier cable and a flexible support wire for vines, said dispenser comprising:
   a rack having support means for supporting said rack on a carrier cable;
   a winding reel for receiving a support wire, said reel rotatably mounted on a front face of said rack about an axis of rotation and including a plurality of first retaining elements integral with said reel;
   a flexible arm including a first end pivotably coupled to said rack and a second, free end spaced from said first end and including an attachment element, said second end of said flexible arm not including structure for connection to a carrier cable, said flexible arm further including at least one second retaining, element, said second retaining element engaging at least one of said first retaining elements in a retaining position in which rotation of said reel is blocked; and
   said arm flexible to effect displacement of said second retaining element between said retaining position and a release position in which said first retaining elements are released, and said arm engageable with a stop on said rack in said release position, wherein said stop comprises:
   a flexible leaf; and
   a stop wall, said arm flexible from said retaining position toward said release position to initially engage said flexible leaf, followed by engagement of said flexible leaf with said stop wall.

2. The dispenser of claim 1, wherein said flexible arm is flexible within a plane parallel to said front face.

3. The dispenser of claim 1, wherein said attachment element is a planar closed loop integrally cantilevered from said second end of said flexible arm.

4. The dispenser of claim 3, wherein said planar closed loop extends in a direction away from said reel.

5. The dispenser of claim 1, wherein said second retaining element is a projecting stud, and said first retaining elements are notches of complementary shape to said projecting stud.

6. The dispenser of claim 1, wherein said first retaining elements are formed on a periphery of a cogwheel integral to said reel.

7. The dispenser of claim 1, wherein said winding reel includes has a hub with side plates at opposite ends thereof, said side plates perpendicular to said hub and having circular contours, and said rack includes a wiper disposed parallel to said hub and overlapping with the respective contours of said side plates.

8. The dispenser of claim 1, in combination with at least one carrier cable, said dispenser supported on only one of said carrier cables by said support means, said free end of said flexible arm not connected to any carrier cable.

* * * * *